US011126576B2

(12) United States Patent
Suzuki et al.

(10) Patent No.: US 11,126,576 B2
(45) Date of Patent: Sep. 21, 2021

(54) INPUT/OUTPUT EXECUTION DEVICE, DEVICE VIRTUALIZATION SYSTEM, INPUT/OUTPUT EXECUTION METHOD, AND RECORDING MEDIUM

(71) Applicant: NEC Corporation, Tokyo (JP)

(72) Inventors: Jun Suzuki, Tokyo (JP); Yuki Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/770,250

(22) PCT Filed: Dec. 19, 2018

(86) PCT No.: PCT/JP2018/046829
§ 371 (c)(1),
(2) Date: Jun. 5, 2020

(87) PCT Pub. No.: WO2019/124450
PCT Pub. Date: Jun. 27, 2019

(65) Prior Publication Data
US 2020/0387463 A1 Dec. 10, 2020

(30) Foreign Application Priority Data
Dec. 20, 2017 (JP) .............................. JP2017-243743

(51) Int. Cl.
G06F 13/24 (2006.01)
G06F 12/1009 (2016.01)
(Continued)

(52) U.S. Cl.
CPC .......... G06F 13/24 (2013.01); G06F 12/1009 (2013.01); G06F 13/102 (2013.01);
(Continued)

(58) Field of Classification Search
CPC ........ G06F 13/10; G06F 13/102; G06F 13/28; G06F 13/4063; G06F 2213/0026
See application file for complete search history.

(56) References Cited

U.S. PATENT DOCUMENTS

2004/0215846 A1 10/2004 Baitinger et al.
2005/0246453 A1 11/2005 Erlingsson et al.
(Continued)

FOREIGN PATENT DOCUMENTS

JP 2004-528656 A 9/2004
JP 2005-322242 A 11/2005
(Continued)

OTHER PUBLICATIONS

International Search Report for PCT Application No. PCT/JP2018/046829, dated Mar. 26, 2019.
(Continued)

Primary Examiner — Glenn A. Auve
(74) Attorney, Agent, or Firm — Sughrue Mion, PLLC

(57) ABSTRACT

Provided is an input/output (I/O) execution device possible for a device driver to input and output to and from an I/O device unconnected to a bridge and an I/O device connected to the bridge through the same interface. The device provided with: a device driver for accessing a virtual space area allocated to an I/O device and thereby issuing an I/O command; a device memory management unit for setting the area to a state in which the area generates a page fault when accessed; an access intercept unit for detecting a page fault generated when the device driver accesses the area, detecting the I/O command issuance, and identifying the I/O command; and an I/O packet transmission/reception unit for generating an I/O packet generated when a bridge connecting an I/O device receives the identified I/O command and
(Continued)

transmitting the generated packet to an I/O device connected to an un-bridge connecting unit.

11 Claims, 9 Drawing Sheets

(51) Int. Cl.
    *G06F 13/10*         (2006.01)
    *G06F 13/28*         (2006.01)
    *G06F 13/40*         (2006.01)

(52) U.S. Cl.
    CPC .......... *G06F 13/28* (2013.01); *G06F 13/4063* (2013.01); *G06F 2213/0026* (2013.01)

(56) References Cited

U.S. PATENT DOCUMENTS

| | | | | |
|---|---|---|---|---|
| 2007/0168641 A1* | 7/2007 | Hummel | ............ | G06F 9/45558 711/206 |
| 2009/0265708 A1* | 10/2009 | Nakajima | ........... | G06F 9/45558 718/1 |
| 2011/0023027 A1* | 1/2011 | Kegel | ................. | G06F 12/1009 718/1 |
| 2013/0061020 A1* | 3/2013 | Koob | ..................... | G06F 13/28 711/202 |
| 2013/0145055 A1* | 6/2013 | Kegel | ................. | G06F 12/0223 710/26 |
| 2013/0346978 A1* | 12/2013 | Jiang | ................... | G06F 9/45558 718/1 |
| 2014/0089528 A1* | 3/2014 | Bloch | .................... | G06F 12/08 710/4 |
| 2015/0095518 A1 | 4/2015 | Suzuki et al. | | |

FOREIGN PATENT DOCUMENTS

| | | |
|---|---|---|
| JP | 2014-235578 A | 12/2014 |
| WO | 2013/150792 A1 | 10/2013 |

OTHER PUBLICATIONS

English translation of Written opinion for PCT Application No. PCT/JP2018/046829, dated Mar. 26, 2019.
A PCI Express Base Specification Revision 2.0, PCI-SIG, Dec. 20, 2006, USA.

* cited by examiner

Fig.4

| ADDRESS IN MAP SPACE | BDF NUMBER | MAC ADDRESS |
|---|---|---|
| x9–x9ffffff | (16, , ) | 36:2a: d1: 68:9:51 |
| xa–xaffffff | (17, , ) | 42:15: d3: 6a:63:11 |
| ... | ... | ... |

ADDRESS MANAGEMENT TABLE 145

Related Art

INPUT/OUTPUT EXECUTION DEVICE, DEVICE VIRTUALIZATION SYSTEM, INPUT/OUTPUT EXECUTION METHOD, AND RECORDING MEDIUM

This application is a National Stage Entry of PCT/JP2018/046829 filed on Dec. 19, 2018, which claims priority from Japanese Patent Application 2017-243743 filed on Dec. 20, 2017, the contents of all of which are incorporated herein by reference, in their entirety.

TECHNICAL FIELD

The present invention relates to an input/output execution device, a device virtualization system, an input/output execution method, and an input/output execution program, and particularly to a device, a system, a method, and a program that can similarly execute input and output of an input/output device un-connected to a bridge and an input/output device connected to the bridge.

BACKGROUND ART

PTL 1 (refer to pages 17 to 18 and FIG. 3) discloses one example of a system that virtualizes an input/output device. FIG. 9 illustrates the input/output device virtualization system in a simplified manner. The input/output device virtualization system includes host 4 being a computer, virtual machine 401 operating inside host 4, virtual machine monitor 402, central processing unit (CPU) 107 being hardware, memory 108, bridge 109, and input/output device 110.

Virtual machine 401 is software that internally provides a virtual environment of a host. Virtual machine 401 includes: input/output device driver 4012 that controls input/output device 110; operating system (OS) 4011; and application 101 that uses input/output device 110. Virtual machine monitor 402 mediates access to hardware resources of host 4 being performed by virtual machine 401. Virtual machine 401, virtual machine monitor 402, input/output device driver 4012, OS 4011, and application 101 are implemented by storing a program in memory 108 and by reading the program by CPU 107.

The input/output device virtualization system including such a configuration operates as follows.

Virtual machine monitor 402 maps input/output device 110 to a memory space of virtual machine 401. Application 101 requests use of input/output device 110 to input/output device driver 4012. Input/output device driver 4012 performs memory writing or reading on the mapped memory space, thereby issuing an input/output command. Bridge 109 generates an input/output packet associated with the issued input/output command, and transmits the input/output packet to input/output device 110.

NPL 1 discloses a PCI Express (registered trademark) standard being an input/output interface specification.

CITATION LIST

Patent Literature

[PTL 1] Japanese Unexamined Patent Application Publication No. 2005-322242

Non Patent Literature

[NPL 1] A PCI Express Base Specification Revision 2.0, PCI-SIG, Dec. 20, 2006

SUMMARY OF INVENTION

Technical Problem

An input/output device that is not connected to the bridge cannot be a control target of the input/output device virtualization system described in PTL 1. In other words, the system cannot virtualize an input/output device remotely connected via a communication network, for example.

An object of the present invention is to provide an input/output execution device, a device virtualization system that solve the above-described problem.

Solution to Problem

An input/output execution device according to one example embodiment of the present invention includes: a device driver that issues an input/output command to an input/output device by accessing an area in a virtual space that is allocated to the input/output device; a device memory management means for setting the area to a condition that a page fault occurs when the area is accessed; an access intercept means for detecting the page fault occurring when the device driver accesses the area, detecting issuance of the input/output command, and identifying the input/output command; and an input/output packet transmission/reception means for generating an input/output packet to be generated when a bridge making connection to the input/output device receives the identified input/output command, and transmitting the input/output packet to the input/output device being connected by connection means that is not the bridge.

An input/output execution method according to one example embodiment of the present invention includes: setting, to a condition that a page fault occurs when an area is accessed, the area in a virtual space that is allocated to an input/output device; issuing an input/output command to the input/output device by accessing the area; detecting the page fault occurring when the area is accessed, detecting issuance of the input/output command, and identifying the input/output command; and generating an input/output packet to be generated when a bridge making connection to the input/output device receives the identified input/output command, and transmitting the input/output packet to the input/output device being connected by connection means that is not the bridge.

An input/output execution program according to one example embodiment of the present invention causes a computer to execute: a device driver of issuing an input/output command to an input/output device by accessing an area in a virtual space that is allocated to the input/output device; device memory management processing of setting the area to a condition that a page fault occurs when the area is accessed; access intercept processing of detecting the page fault occurring when the device driver accesses the area, detecting issuance of the input/output command, and identifying the input/output command; and input/output packet transmission/reception processing of generating an input/output packet to be generated when a bridge making connection to the input/output device receives the identified input/output command, and transmitting the input/output packet to the input/output device being connected by connection means that is not the bridge.

Advantageous Effects of Invention

An input/output execution device according to the present invention enables a device driver to perform, through the same interface, input/output of an input/output device unconnected to a bridge and input/output of an input/output device connected to the bridge.

BRIEF DESCRIPTION OF DRAWINGS

FIG. 4 is a diagram illustrating a configuration of address management table 145.

EXAMPLE EMBODIMENT

First Example Embodiment

<Entire Configuration>

Figure 1:
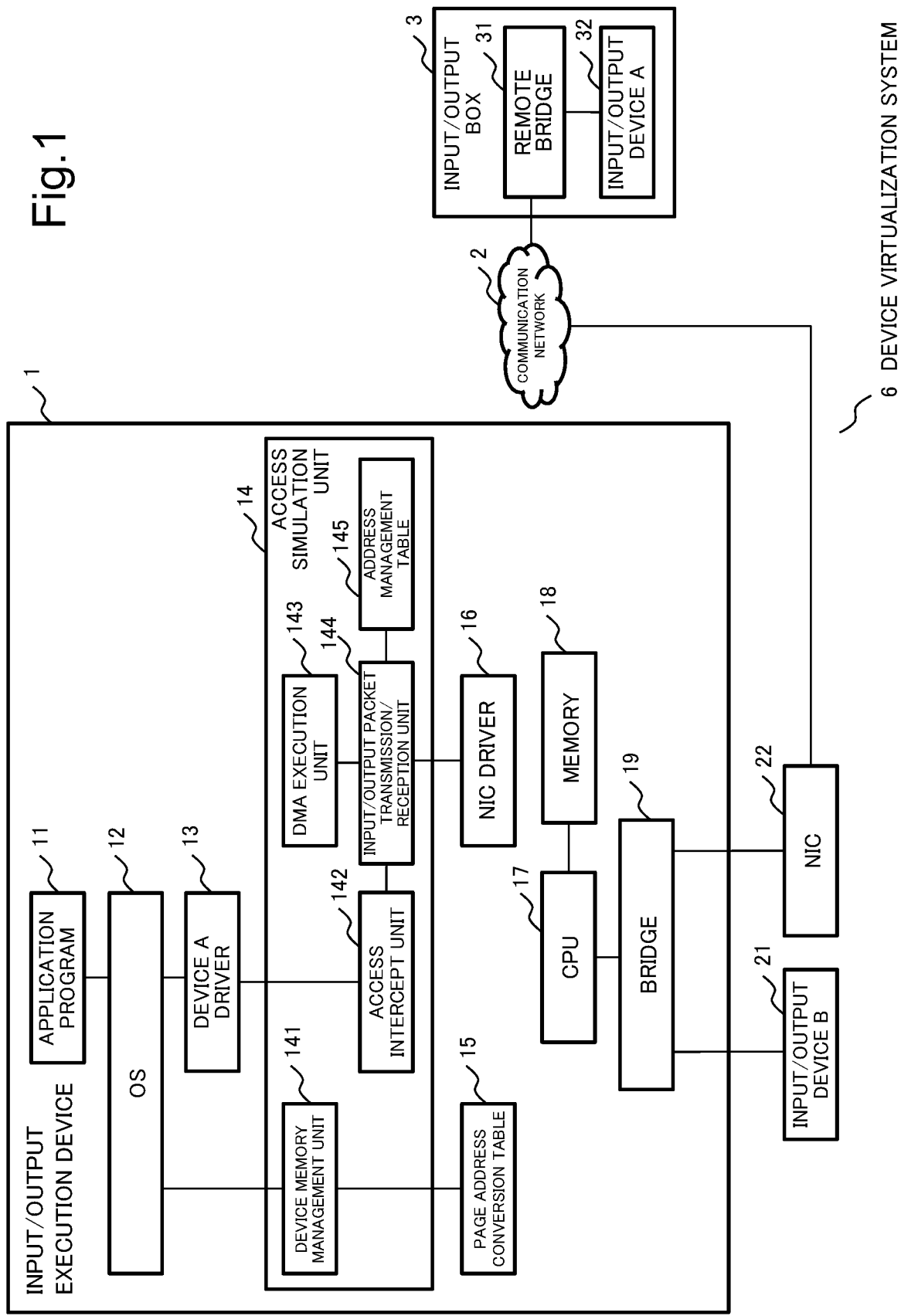
FIG. 1 is a diagram illustrating a configuration of device virtualization system 6 according to a first example embodiment.

FIG. 1 is a diagram illustrating a configuration of device virtualization system 6 according to the present example embodiment. Device virtualization system 6 includes input/output execution device 1 being a computer, and input/output box 3. Input/output box 3 accommodates input/output device A 32 to be remotely connected to input/output execution device 1 via communication network 2. Communication network 2 is an Ethernet (registered trademark) for example, but may be another network such as an Internet protocol (IP) network.

To input/output execution device 1, network interface card (NIC) 22 is connected, NIC 22 being an input/output device for performing communication of the network. Input/output execution device 1 is connected to communication network 2 via NIC 22. To input/output execution device 1, another input/output device of which example is input/output device B 21 may be locally connected not via communication network 2. Each of input/output device A 32 and input/output device B 21 is an NIC, a storage interface, or a serial bus interface. The number of input/output devices B 21 may be equal to or more than two.

Input/output execution device 1 includes application program 11, OS 12, device A driver 13, page address conversion table 15, and NIC driver 16. Application program 11 is a task processing program, and uses remotely connected input/output device A 32 and locally connected input/output device B 21, for example. OS 12 is an operating system of input/output execution device 1. Device A driver 13 controls remotely connected input/output device A 32. Access simulation unit 14 simulates (virtualizes) remotely connected input/output device A 32 as if input/output device A 32 were locally connected. Page address conversion table 15 holds association information for converting, into a physical address, a virtual address to be accessed by software. NIC driver 16 controls NIC 22.

Input/output execution device 1 includes CPU 17 that performs calculation, memory 18 that stores a program and data, and bridge 19 that connects CPU 17 and the input/output device to each other. Input/output device B 21 and NIC 22 that are locally connected to input/output execution device 1 are inserted into input/output slots of input/output execution device 1, and are connected to bridge 19 by an input/output bus based on a predetermined input/output bus standard of which example is a PCI Express (registered trademark: hereinafter, abbreviated as PCIe) standard. The input/output bus may be based on another standard.

Access simulation unit 14 includes device memory management unit 141, access intercept unit 142, input/output packet transmission/reception unit 144, direct memory access (DMA) execution unit 143, and address management table 145.

Device memory management unit 141 manages a memory space to which the remotely connected input/output device is mapped. Input/output execution device 1 uses a memory-mapped input/output method, and CPU 17 executes an instruction of reading (memory reading) or writing (memory writing) targeting a specific memory area allocated to the input/output device, and thereby makes an input/output instruction to the input/output device. For example, when it is desired to make an instruction of brightness to a display device, software such as a device driver performs memory writing of a designated value C of brightness to an address A in the memory. When it is desired to acquire status information of a printer, the device driver or the like performs memory reading on an address B.

Hereinafter, "an input/output command" denotes an input/output instruction. "Issuance of an input/output command" denotes execution of a memory writing instruction or a memory reading instruction that depends on the instruction command to be performed in order to make an instruction of the input/output command to the input/output device. For example, an instruction of brightness to the display device is "an input/output command", and execution of an instruction for performing memory writing of the designated value C of brightness to the address A in the memory is "issuance of an input/output command". An instruction of status information acquisition to the printer is "an input/output command", and execution of an instruction for performing memory reading on the address B is "issuance of an input/output command". The same applies to similar expressions. "A memory space to which an input/output device is mapped" denotes a memory area allocated to the input/output device, and "mapping of an input/output device" denotes allocation of a memory area to the input/output device. Memory access or simply-mentioned access denotes either one or both of memory writing and memory reading.

Access intercept unit 142 detects that device A driver 13 has issued an input/output command to remotely connected input/output device A 32. In other words, access intercept unit 142 detects that device A driver 13 has executed a memory access instruction depending on a content of the input/output command. Input/output packet transmission/reception unit 144 generates and transmits an input/output packet for transmitting the issued input/output command to remotely connected input/output device A 32, and identifies a content to be instructed by an input/output packet received from input/output device A 32.

DMA execution unit 143 executes requested DMA when remotely connected input/output device A 32 requests the DMA. Address management table 145 holds an address to be used as a destination when input/output packet transmission/reception unit 144 transmits the input/output packet to remotely connected input/output device A 32. The input/output packet is loaded as a payload into a frame or a packet for communication network 2 (hereinafter simply referred to as a frame), i.e., is encapsulated and transmitted and received. Contrary to encapsulating, decapsulating denotes extracting, from a frame, an input/output packet loaded as a payload. Encapsulating and decapsulating may include encrypting/decrypting of an input/output (I/O) packet.

Herein, application program 11, OS 12, device A driver 13, and NIC driver 16 are programs that are stored in memory 18 and that are read and executed by CPU 17. Page address conversion table 15 and address management table 145 are data structures to be stored in memory 18.

Device memory management unit 141, access intercept unit 142, input/output packet transmission/reception unit 144, and DMA execution unit 143 may be input/output execution programs that are stored in memory 18 and that are read and executed by CPU 17, or may be dedicated processing devices or logic circuits to be controlled by firmware.

Input/output box 3 includes remote bridge 31 in addition to above-described input/output devices A 32. Remote bridge 31 connects input/output device A 32 to communication network 2. In other words, input/output device A 32 is connected to input/output execution device 1 via remote bridge 31, communication network 2, and NIC 22. Input/output device A 32 and remote bridge 31 are connected to each other by, for example, an input/output bus based on the PCIe standard that is the same as the connection between bridge 19 and the input/output devices.

<Configuration of Virtual Memory Space 5>

Figure 2:
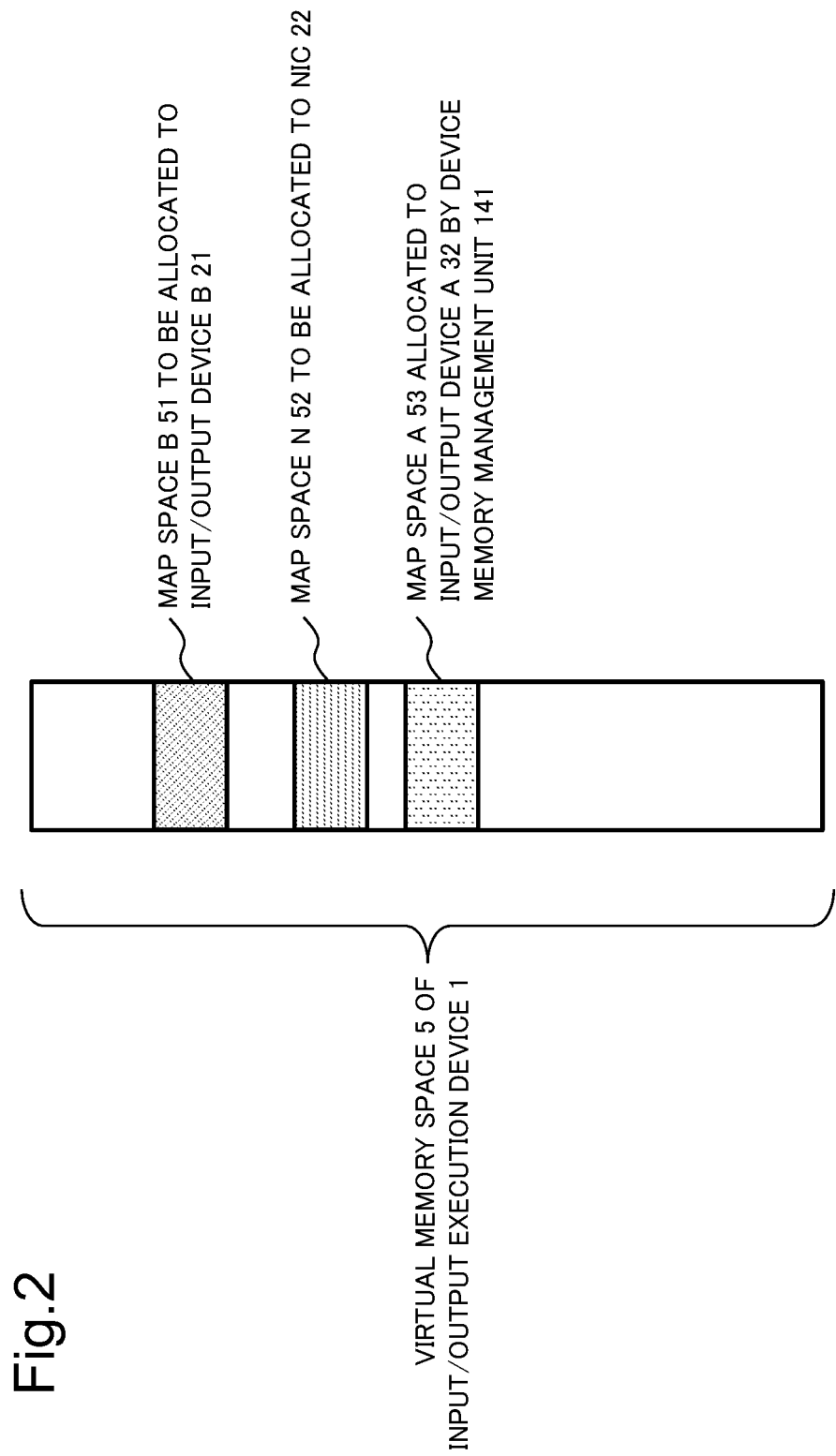
FIG. 2 is a diagram illustrating virtual memory space 5 of input/output execution device 1.

FIG. 2 is a diagram illustrating virtual memory space 5 of input/output execution device 1. In virtual memory space 5 of memory-mapped input/output execution device 1, there is an area to which the locally connected input/output device is mapped. When input/output execution device 1 includes the configuration illustrated in FIG. 1, in virtual memory space 5 of input/output execution device 1, there are map space B 51 being an area to be allocated to input/output device B 21, and map space N 52 being an area to be allocated to NIC 22. Meanwhile, there is not an area to be allocated to remotely connected input/output device A 32. Allocation information of virtual memory space 5 is registered in information managed by OS 12.

However, in input/output execution device 1 according to the present example embodiment, device memory management unit 141 maps remotely connected input/output device A 32 to virtual memory space 5. Device memory management unit 141 refers to the information managed by OS 12, retrieves, from virtual memory space 5, an area that does not overlap with the areas to be allocated to the locally connected input/output devices such as map space B 51 and map space N 52, and allocates the retrieved area to input/output device A 32. This area is map space A 53 in FIG. 2. Device memory management unit 141 maps input/output device A 32 to virtual memory space 5 by registering map space A 53 in the information managed by OS 12.

<Configuration and Role of Page Address Conversion Table 15>

Device memory management unit 141 sets page address conversion table 15 in such a manner as to generate a page fault interrupt when CPU 17 accesses map space A 53 to which input/output device A 32 is mapped. CPU 17 executing device A driver 13 of input/output device A 32 accesses one part of map space A 53 at the time of issuance of an input/output command. The one part of map space A 53 to be accessed is an area of an address to which memory access is performed at the time of the issuance of the input/output command, i.e., is an area of a destination address (an operand address) of memory writing or memory reading instruction, and for example, is the area of the address A or the address B in the above-described example. Access intercept unit 142 can detect the issuance of the input/output command by a page fault interrupt to be generated by a memory access instruction at the time of the issuance of the input/output command.

Figure 3:
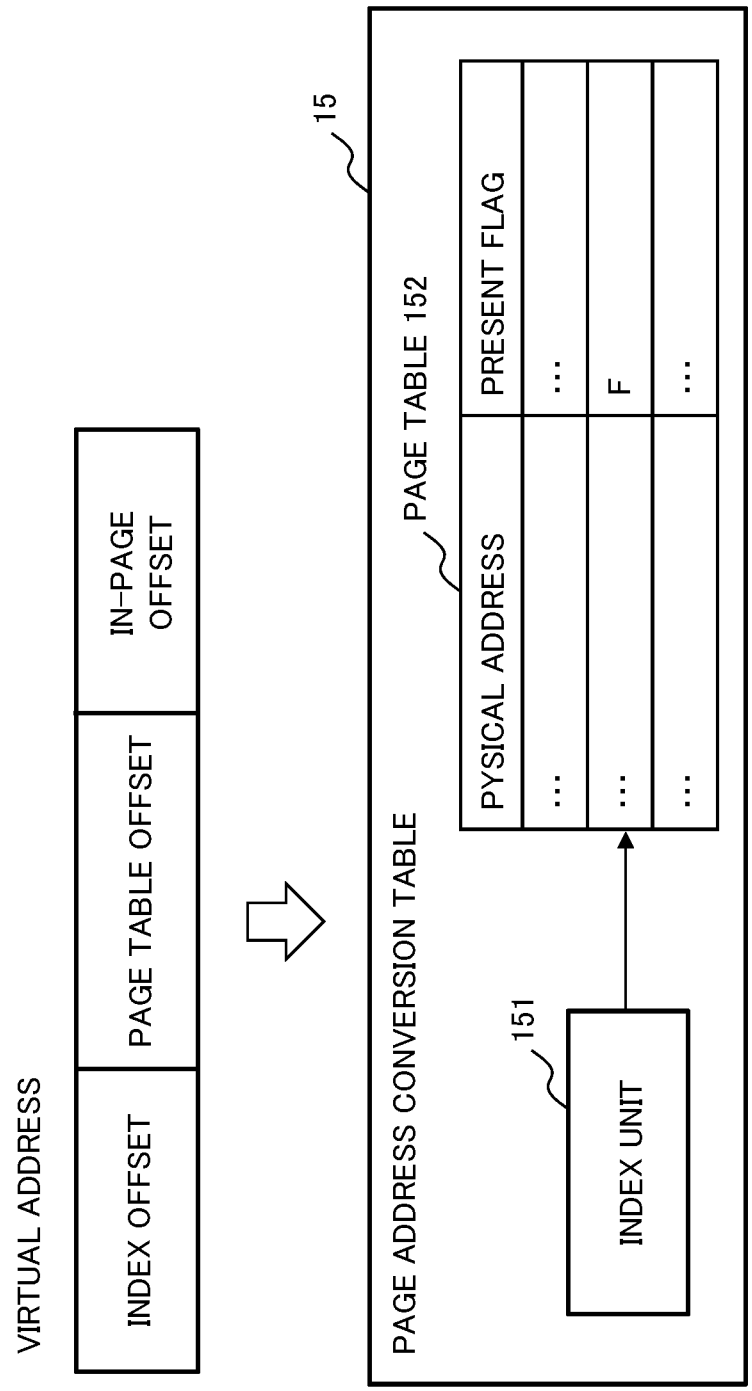
FIG. 3 is a diagram illustrating a configuration of page address conversion table 15.

FIG. 3 is a diagram illustrating a configuration of page address conversion table 15. Page address conversion table 15 holds information for converting a virtual address in virtual memory space 5 into a physical address. As illustrated in FIG. 3, the virtual address is constituted by an index offset, a page table offset, and an in-page offset. Page address conversion table 15 includes index unit 151 and page table 152. Index unit 151 stores a value to be uniquely calculated from the index offset of the virtual address, and this value specifies page table 152 used for converting the virtual address sharing the index offset.

In specified page table 152, for example, an entry associated with the page table offset of a virtual address V stores a head physical address of a physical memory page for which conversion is performed when the virtual address V is accessed. A page is a unit for managing a memory, and is 4 kilobytes, for example. A value acquired by adding the in-page offset of the virtual address V to the head physical address is a value of the physical address associated with the virtual address V.

Such a conversion of the virtual address into the physical address by using the information held by page address conversion table 15 is executed by reading page address conversion table 15 by a memory management unit (MMU not illustrated in the drawings) incorporated in CPU 17. Page table 152 holds a present flag in addition to a physical address of each memory page. When the flag is False (F), a page fault interrupt occurs in CPU 17 when software operating in CPU 17 accesses an associated memory space. Device memory management unit 141 sets, to F, the present flag of an entry in page table 152 associated with the above-described one part of the map area A 53 of input/output device A 32.

<Cooperation of Each Unit when Issuance of Input/Output Command is Detected and Configuration of Address Management Table>

Application program 11 request use of input/output device A 32 from device A driver 13 via an interface provided by OS 12.

Device A driver 13 receives the request from application program 11, issues an input/output command to input/output device A 32, and receives a response of command execution completion from input/output device A 32. When device A driver 13 issues the input/output command to input/output device A 32, memory access to map space A 53 of input/output device A 32 is performed as described above.

Access intercept unit 142 is registered, in OS 12, as an interrupt processing routine for a page fault interrupt, for example, and detects that device A driver 13 has issued the input/output command to input/output device A 32, by the page fault. For map space A 53 to which memory access has been performed by device A driver 13, F is set in the associated present flag of an entry in page table 152 of page address conversion table 15. Accordingly, when the access occurs, the MMU incorporated in CPU 17 generates the page fault interrupt, and access intercept unit 142 is called.

Access intercept unit 142 examines a memory access instruction that has caused the page fault interrupt, and for example, identifies a content of the input/output command from a type of the instruction, an address accessed by the instruction, and a value of data to be stored in the address. When an interrupt occurs, CPU 17 stores an interrupt occurrence address in a predetermined memory area. Access intercept unit 142 acquires, from this interrupt occurrence address, a memory access instruction that has caused the page fault interrupt, and examines the memory access instruction.

A specific method of examining an instruction depends on a specification of the memory access instruction to be used for issuing the input/output command. Herein, the type of the instruction is a difference of being memory writing or memory reading and a difference in target data length, for example. The address at which writing or reading is performed by the instruction is, for example, the address A or the address B in the above-described example. The value of data to be stored at the address is, for example, the value C in the above-described example.

Access intercept unit 142 requests input/output packet transmission/reception unit 144 to transmit the identified input/output command to input/output device A 32 as a destination. When the input/output command needs completion synchronization, access intercept unit 142 is made to be in a sleep state until execution completion notification of the input/output command is received from input/output packet transmission/reception unit 144. For example, when the input/output command transmitted to input/output device A 32 is status information acquisition, access intercept unit 142 is made to be in a sleep state until status information is received.

Input/output packet transmission/reception unit 144 that receives the request for transmitting the input/output command generates, for executing the input/output command, an input/output packet depending on the input/output command, based on a predetermined standard of an input/output bus, and exchanges the input/output packet with input/output device A 32. Herein, the input/output packet to be generated and exchanged by input/output packet transmission/reception unit 144 is the same as an input/output packet to be generated and exchanged by bridge 19 when bridge 19 receives the same input/output command.

In other words, input/output packet transmission/reception unit 144 and bridge 19 generate the same input/output packet, depending on the same input/output command to the same input/output device, and exchange the same input/output packet with input/output device A 32. In this sense, input/output packet transmission/reception unit 144 functions as virtual bridge 19. The input/output packet is based on a standard of an input/output bus when bridge 19 makes connection to input/output device A 32. This standard is the PCIe standard, for example, and as stated in NPL 1, a packet associated with memory access is defined in the PCIe standard.

FIG. 4 is a diagram illustrating a configuration of address management table 145. For each of remotely connected input/output devices, address management table 145 includes a virtual address range of a map space to be allocated to the input/output device, an address of the input/output device, and a communication address of remote bridge 31 in input/output box 3 including the input/output device. When the bus standard is the PCIe standard, the address of the input/output device is a BDF (registered trademark) number (a set of a bus number, a device number, and a function number). When communication network 2 is the Ethernet, the communication address of remote bridge 31 is a MAC address.

Input/output packet transmission/reception unit 144 refers to address management table 145 illustrated in FIG. 4, and retrieves an address of remote bridge 31 associated with a destination memory address described in a header of the generated input/output packet. This destination memory address is an address that is in the map space A to be accessed when an input/output command is issued.

Input/output packet transmission/reception unit 144 sets, as a destination, the retrieved address of remote bridge 31, and generates a frame, such as an Ethernet frame for communication network 2 into which the generated input/output packet is encapsulated. Input/output packet transmission/reception unit 144 requests NIC driver 16 to transmit the generated frame.

Input/output packet transmission/reception unit 144 also receives a frame for communication network 2 into which an input/output packet issued by input/output device A 32 is encapsulated, decapsulates the frame, and extracts the input/output packet. When an instruction of the extracted input/output packet is completion notification for the input/output command issued by device A driver 13, input/output packet transmission/reception unit 144 makes notification to access intercept unit 142.

When the instruction of the input/output packet is DMA to memory 18 by input/output device A 32, input/output packet transmission/reception unit 144 requests DMA execution unit 143 to execute the designated DMA, and after the completion, receives a completion response notification from DMA execution unit 143. Input/output packet transmission/reception unit 144 generates an input/output packet for notifying input/output device A 32 of DMA completion response notification, encapsulates the input/output packet into a frame for communication network 2, and requests NIC driver 16 to transmit the frame to remote bridge 31 as a destination.

At this time, input/output packet transmission/reception unit 144 retrieves address management table 145 by using, as a key, the device address of input/output device A 32 such as the BDF number in the bus of the PCIe standard, and acquires an address of remote bridge 31. The device address of input/output device A 32 is given from DMA execution unit 143.

In the case of being requested to write data in memory 18, DMA execution unit 143 extracts, from the input/output packet, a memory address of a writing destination and writing-target data, and executes data writing. In the case of being requested to read data from memory 18, DMA execution unit 143 extracts a memory address of a read source from the input/output packet, and stores the data to be stored at the address, in a buffer specified by input/output packet transmission/reception unit 144.

When completing the requested DMA, DMA execution unit 143 notifies input/output packet transmission/reception unit 144 of completion notification. At this time, DMA execution unit 143 extracts the device address of input/output device A 32 from the input/output packet, and notifies input/output packet transmission/reception unit 144 of the device address.

NIC driver 16 controls NIC 22 being a device for transmitting a frame to and receiving a frame from communication network 2. NIC driver 16 receives the request from input/output packet transmission/reception unit 144, and controls NIC 22 in such a manner that NIC 22 transmits, to remote bridge 31, an Ethernet frame into which the input/output packet is encapsulated. NIC driver 16 also gives, to input/output packet transmission/reception unit 144, a frame into which an input/output packet received by NIC 22 is encapsulated.

Remote bridge 31 receives, from communication network 2, the frame, such as an Ethernet frame, into which the input/output packet destined for input/output device A 32 is encapsulated, decapsulates the frame, extracts the input/output packet from the frame, and gives the input/output packet to input/output device A 32. Remote bridge 31 also receives, from input/output device A 32, an input/output packet destined for input/output execution device 1, encapsulates the input/output packet by loading the input/output packet into a frame destined for an address of NIC 22, and transmits the frame to communication network 2.

<Operation>

Next, operation according to the present example embodiment is described in detail with reference to the drawings.

Figure 5:
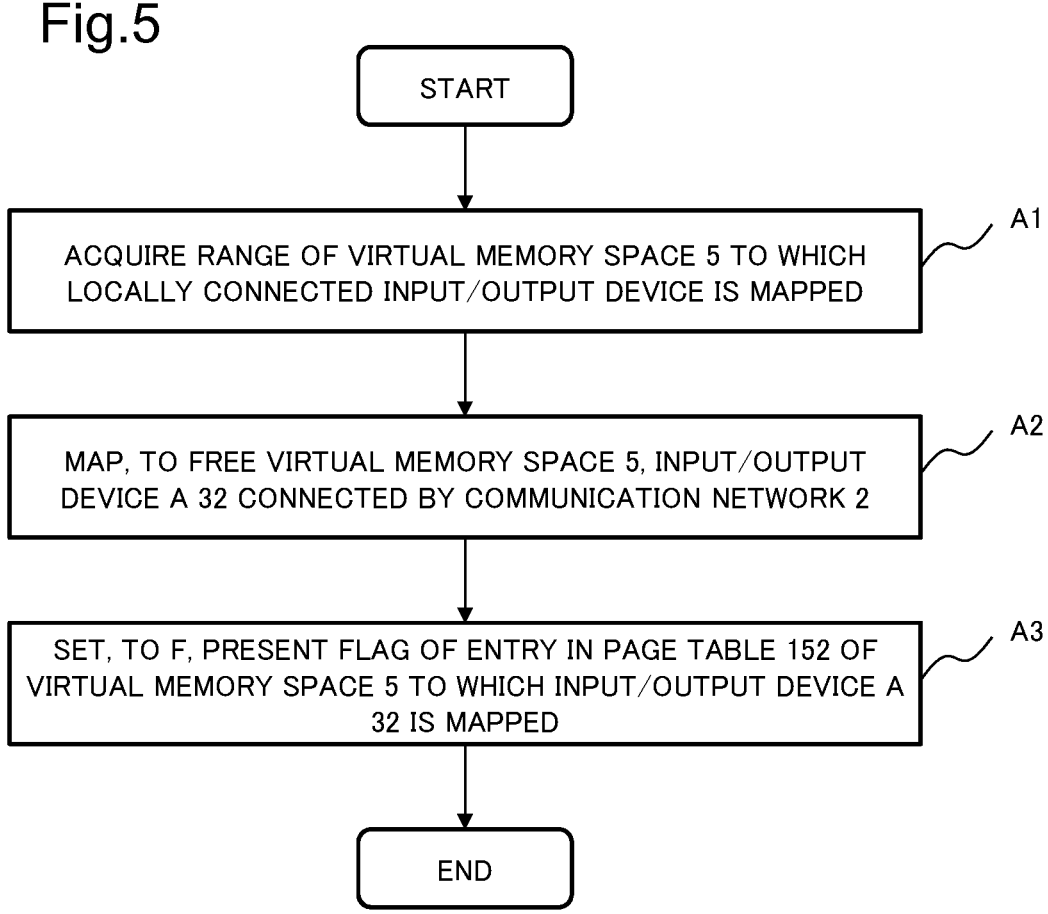
FIG. 5 is a flowchart illustrating an operation in which device memory management unit 141 maps input/output device A 32 to a memory space of input/output execution device 1.

FIG. 5 is a flowchart illustrating the operation in which device memory management unit 141 maps input/output device A 32 to the memory space of input/output execution device 1. Device memory management unit 141 acquires, from information managed by OS 12, an address range of virtual memory space 5 to which the locally connected input/output device inserted into the input/output slot of input/output execution device 1 is mapped (step A1). Subsequently, device memory management unit 141 selects a free area from virtual memory space 5, and registers, in the information managed by OS 12, a range of the free area as map space A 53 to which remotely connected input/output device A 32 is mapped (step A2). Subsequently, device memory management unit 141 sets, to F, a present flag of an entry in page table 152 of page address conversion table 15 associated with map space A 53 (step A3). Device memory management unit 141 may set, to F, a present flag only in an address range to which memory access is performed when an input/output command is issued to input/output device A 32.

Figure 6:
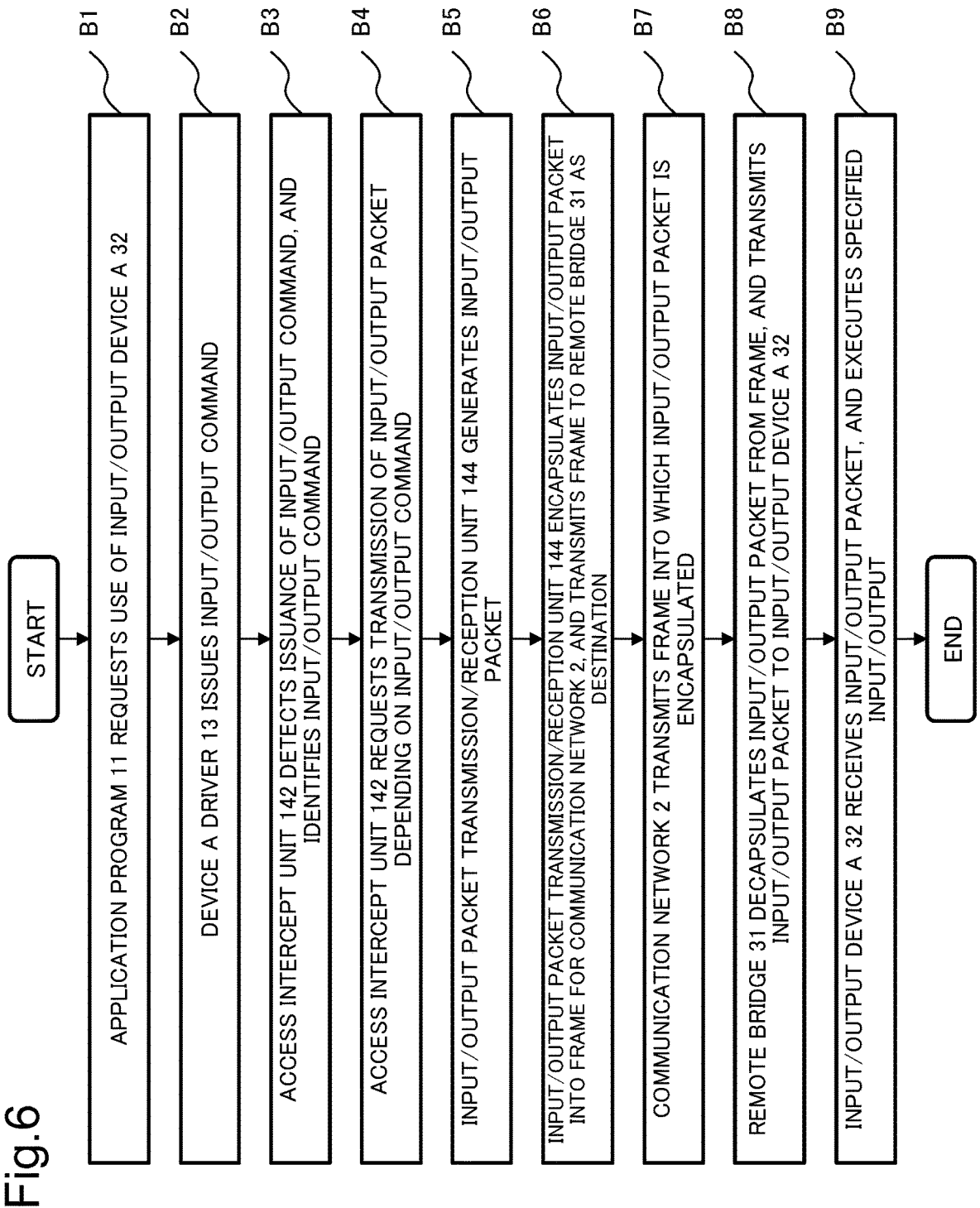
FIG. 6 is a flowchart illustrating an operation in which device A driver 13 issues an input/output command to remotely connected input/output device A 32.

FIG. 6 is a flowchart illustrating the operation in which device A driver 13 issues an input/output command to remotely connected input/output device A 32. Application program 11 makes a request for using input/output device A 32 to device A driver 13 via an interface provided by OS 12 (step B1). Device A driver 13 issues the input/output command to input/output device A 32 (step B2). The issuance of the input/output command is implemented by performing memory access to map space A 53.

Access intercept unit 142 detects, by occurrence of a page fault, the input/output command issuance to input/output device A 32 performed by device A driver 13, and identifies the input/output command (step B3). By analyzing an instruction of the memory access causing the page fault to occur in CPU 17, access intercept unit 142 identifies the input/output command issued by device A driver 13. Herein, access intercept unit 142 analyzes a type, a parameter value, and the like of the input/output command. Access intercept unit 142 requests input/output packet transmission/reception unit 144 to generate and transmit an input/output packet depending on the issued input/output command (step B4). At this time, access intercept unit 142 gives information on the memory access instruction that has issued the input/output command such as a destination address and memory writing data.

Input/output packet transmission/reception unit 144 generates the input/output packet requested by access intercept unit 142, depending on the input/output command (step B5).

Subsequently, the input/output packet transmission/reception unit 144 encapsulates the generated input/output packet by loading the input/output packet into a frame of which destination is an address of remote bridge 31 to which input/output device A 32 is connected. At this time, input/output packet transmission/reception unit 144 acquires the communication address of remote bridge 31 from address management table 145. The communication address associated with a destination memory address of the memory access instruction that has issued the input/output command among the entries held by address management table 145 is a retrieving-target address. Input/output packet transmission/reception unit 144 transmits, to remote bridge 31 as a destination, the frame into which the input/output packet is encapsulated (step B6). Herein, input/output packet transmission/reception unit 144 requests NIC driver 16 to transmit the frame to communication network 2, and NIC driver 16 transmits the requested frame to communication network 2.

Subsequently, communication network 2 transmits the transmitted frame to remote bridge 31 (step B7). Remote bridge 31 receives the Ethernet frame into which the input/output packet is encapsulated, extracts the input/output packet by decapsulation, and transmits the input/output packet to input/output device A 32 (step B8). Input/output device A 32 receives the input/output packet, and executes input/output to be instructed by the input/output packet (step B9).

Figure 7:
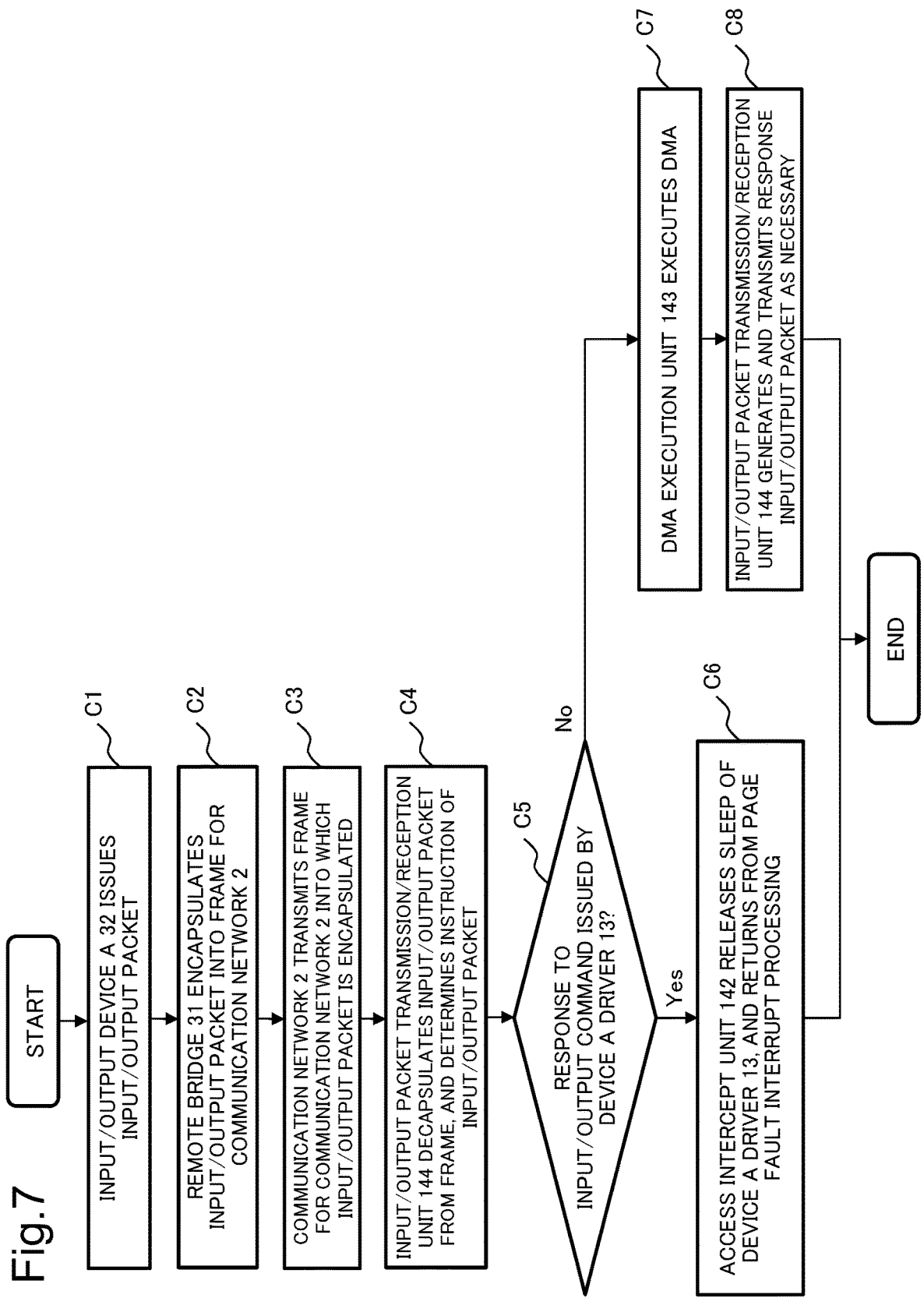
FIG. 7 is a flowchart illustrating an operation in which input/output device A 32 transmits an input/output packet to input/output execution device 1.

FIG. 7 is a flowchart illustrating the operation in which input/output device A 32 transmits an input/output packet to input/output execution device 1. When input/output device A 32 issues an input/output packet in response to the received input/output command and the like (step CO, remote bridge 31 encapsulates the input/output packet into a frame for communication network 2 that is destined for the address of NIC 22, and transmits the frame to communication network 2 (step C2). Communication network 2 transfers, to input/output execution device 1, the frame into which the input/output packet is encapsulated (step C3).

NIC driver 16 gives, to input/output packet transmission/reception unit 144, the frame received by NIC 22. Input/output packet transmission/reception unit 144 extracts the input/output packet from the frame by decapsulation, and determines an instruction of the input/output packet (step C4).

When the instruction of the input/output packet is a response to the input/output command previously issued by device A driver 13 (yes in step C5), input/output packet transmission/reception unit 144 notifies access intercept unit 142 of the response. When the instruction is response data to the input/output command of requesting information such as a status, input/output packet transmission/reception unit 144 gives the received response data to access intercept unit 142. Access intercept unit 142 receives the response, releases the sleep state, returns from the page fault interrupt, and continues processing of device A driver 13 (step C6). At this time, in the case of the response data such as status information of input/output device A 32, access intercept unit 142 copies the response data to memory 18 to be specified by a memory reading instruction that has issued the input/output command. This part of memory 18 may be an area that is not in a state of a page fault in map space A 53, or may be another area in virtual memory space 5 of input/output execution device 1. Thereby, device A driver 13 that has returned from the page fault interrupt can refer to the response data.

In step C5, when the received input/output packet is not a response packet to the input/output command previously issued by device A driver 13 (no in step C5), the received input/output packet is an input/output packet of requesting execution of DMA. In this case, input/output packet transmission/reception unit 144 transmits the received DMA request to DMA execution unit 143. DMA execution unit 143 executes the transmitted DMA request (step C7). When the DMA request is a request of writing in memory 18, DMA execution unit 143 transmits data to be stored in the input/output packet, to memory 18 of a destination address to be stored in the input/output packet.

Meanwhile, when the DMA request is a request of reading from memory 18, DMA execution unit 143 gives, to input/output packet transmission/reception unit 144, data to be stored in memory 18 of a destination address to be stored in the input/output packet. Input/output packet transmission/reception unit 144 stores the received data in an input/output packet, and transmits the input/output packet as a reply to input/output device A 32. When a response input/output packet is needed to the requested DMA, input/output packet transmission/reception unit 144 generates the response input/output packet, and transmits the response input/output packet to input/output device A 32. When the DMA request is a request for reading from memory 18, read data are stored in the response input/output packet.

A process in which this generated response input/output packet is encapsulated into a frame and is delivered to input/output device A 32 by using communication network 2 is the same as that at the time of transmission of the input/output command illustrated in FIG. 6.

Modified Example

Input/output box 3 may be connected to input/output execution device 1 by another interface rather than via NIC 22 and communication network 2. For example, input/output box 3 may be connected to input/output execution device 1 via an input/output control board of a small computer system interface (SCSI) standard.

Map space A 53 may be fixedly given by a parameter or the like previously set in device virtualization system 6. In this case, an administrator determines a free virtual memory space 5 in consideration of the input/output device locally connected to input/output execution device 1, determines map space A 53, and performs parameter setting and the like.

Input/output device A 32 does not necessarily need to be an input/output device that performs DMA transfer. Input/output device A 32 may be an input/output device that transmits and receives data by means of an input/output command. In this case, DMA execution unit 143 may be omitted.

Advantageous Effects

Input/output execution device 1 according to the present example embodiment can virtualize input/output device A 32 that is not connected to bridge 19, such as input/output device A 32 that is remotely connected via communication network 2, as if input/output device A 32 were connected to bridge 19. In other words, input/output execution device 1 can virtualize input/output device A 32 remotely connected via the Ethernet, for example, as if input/output device A 32 were connected to bridge 19. As a result, input/output execution device 1 enables device A driver 13 or the like to perform, through the same interface, input/output of the input/output device un-connected to bridge 19 and input/output of the input/output device connected to bridge 19.

The reason is that access intercept unit 142 detects a page fault that occurs when device A driver 13 accesses the area (map space A 53) allocated to input/output device A 32, and access intercept unit 142 detects issuance of an input/output command, and identifies the command. The reason is also that input/output packet transmission/reception unit 144 then generates an input/output packet to be generated when bridge 19 making connection to input/output device A 32 receives the identified input/output command, and transmits the input/output packet to input/output device A 32 connected through an un-bridge connection means such as communication network 2.

As a result, input/output execution device 1 according to the present example embodiment improves a degree of freedom in arrangement of an input/output device in device virtualization system 6. For example, by input/output execution device 1, an input/output device connected to bridge 19 can be changed to be in connection via communication network 2 without affecting the device driver.

Input/output execution device 1 according to the present example embodiment also improves a degree of freedom in arrangement of an input/output device of already operating device virtualization system 6. The reason is that when access simulation unit 14 is introduced, the already used device driver does not need to be changed.

Second Example Embodiment

Figure 8:
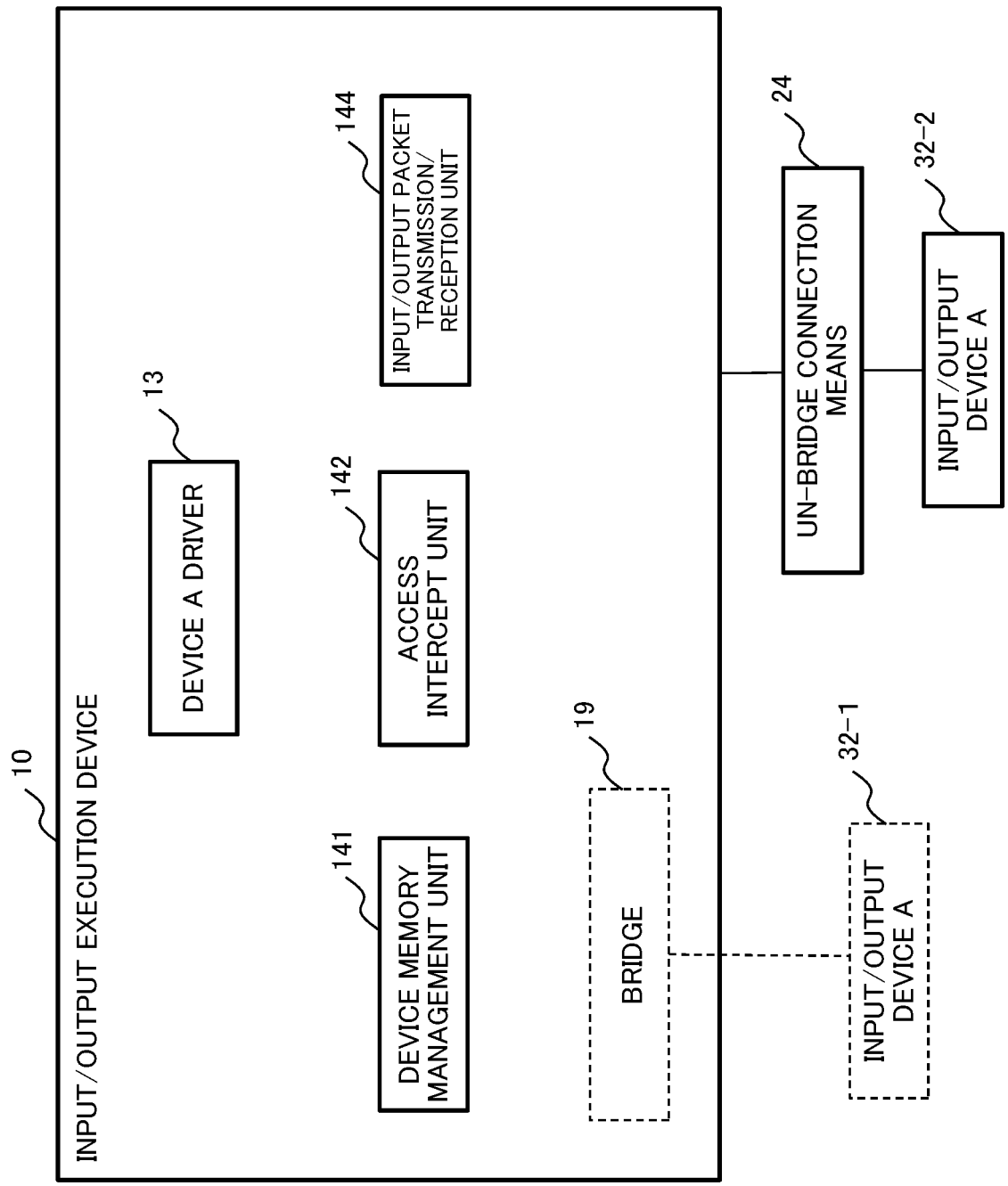
FIG. 8 is a configuration diagram of input/output execution device 1 according to the present example embodiment.
Figure 9:
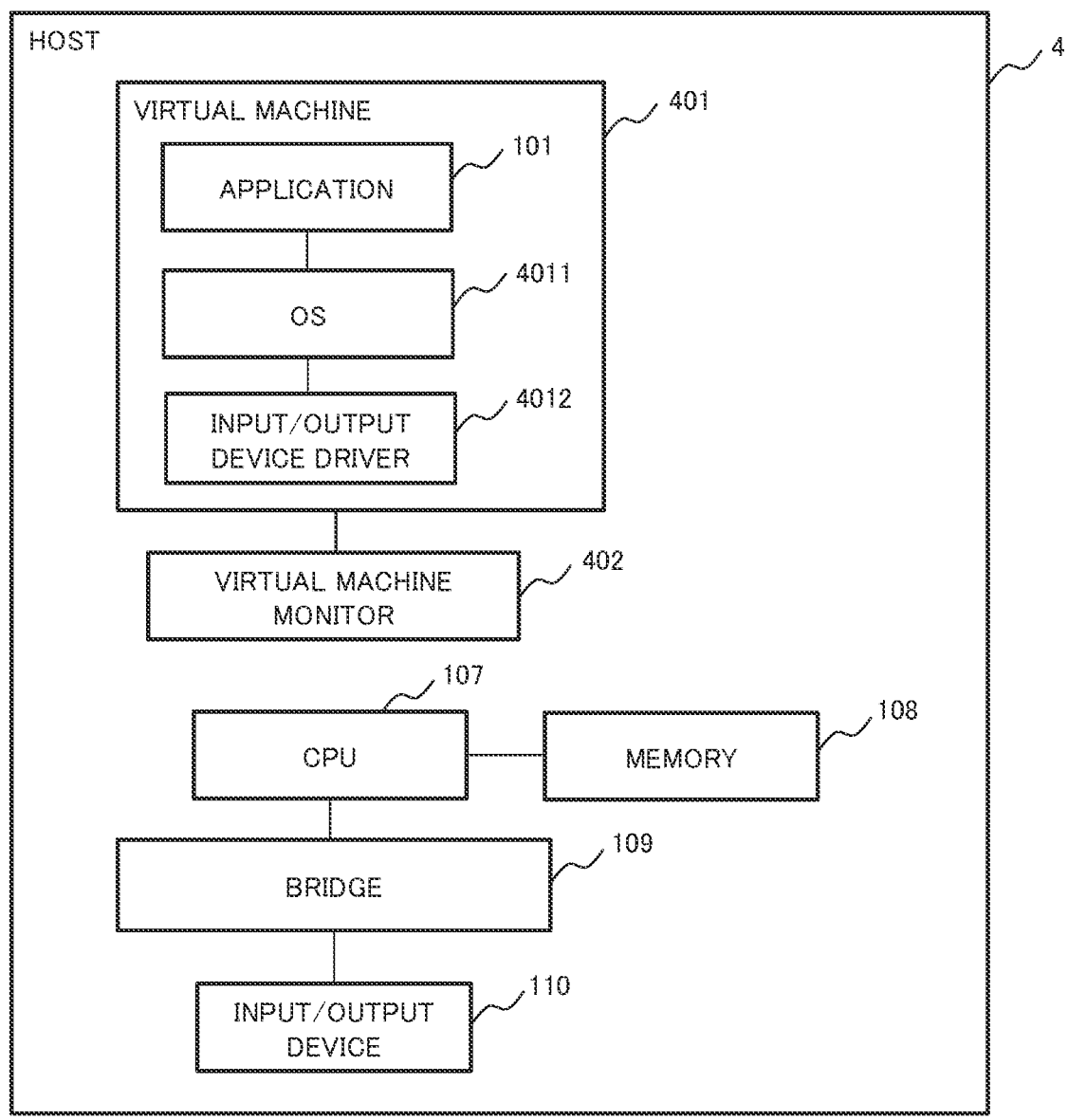
FIG. 9 is a diagram illustrating an input/output device virtualization system disclosed in PTL 1.

FIG. 8 is a configuration diagram of input/output execution device 10 according to the present example embodiment. Input/output execution device 10 includes device A driver 13, device memory management unit 141, access intercept unit 142, and input/output packet transmission/reception unit 144.

Device A driver 13 issues an input/output command by accessing an area in a virtual space that is allocated to input/output device A 32-2. Device memory management unit 141 sets the area in the virtual space to a condition that a page fault occurs when the area is accessed. Access intercept unit 142 detects a page fault occurring when the area is accessed by device A driver 13, detects issuance of an input/output command, and identifies the input/output command. Input/output packet transmission/reception unit 144 generates an input/output packet to be generated when bridge 19 making connection to input/output device A 32-1 receives the identified input/output command, and transmits the input/output packet to input/output device A 32-2 to be connected through un-bridge connection means 24.

Herein, input/output device A 32-1 and input/output device A 32-2 are the same type of input/output devices. Input/output execution device 10 does not need to include bridge 19 connected to input/output device A 32-1. Un-bridge connection means 24 is NIC 22 and communication network 2 in FIG. 1, for example.

Input/output execution device 10 according to the present example embodiment virtualizes input/output device A 32-2 that is not connected to bridge 19, as if input/output device A 32-2 were input/output device A 32-1 connected to bridge 19. As a result, input/output execution device 10 enables device A driver 13 and the like to perform, through the same interface, input/output of the input/output device un-connected to bridge 19 and input/output of the input/output device connected to bridge 19.

The reason is that access intercept unit 142 detects a page fault that occurs when device A driver 13 accesses an area (map space A 53) allocated to input/output device A 32-2, detects issuance of an input/output command, and identifies the command. The reason is also that input/output packet transmission/reception unit 144 then generates an input/output packet to be generated when bridge 19 making connection to input/output device A 32-1 receives the identified input/output command, and transmits the input/output packet to input/output device A 32-2 connected by un-bridge connection means 24.

As a result, input/output execution device 10 according to the present example embodiment improves a degree of freedom in arrangement of an input/output device in device virtualization system 6. For example, by input/output execution device 10, an input/output device connected to bridge 19 can be changed to be in connection via communication network 2 without affecting the device driver.

Input/output execution device 10 according to the present example embodiment also improves a degree of freedom in arrangement of an input/output device of already operating device virtualization system 6. The reason is that when access simulation unit 14 is introduced, the already used device driver does not need to be changed.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-243743, filed on Dec. 20, 2017, the disclosure of which is incorporated herein in its entirety by reference.

REFERENCE SIGNS LIST

1 Input/output execution device
2 Communication network
3 Input/output box
4 Host
5 Virtual memory space
6 Device virtualization system
10 Input/output execution device
11 Application program
12 OS
13 Device A driver
14 Access simulation unit
15 Page address conversion table
16 NIC driver
17 CPU
18 Memory
19 Bridge
21 Input/output device B
22 NIC
24 Un-bridge connection means
31 Remote bridge
32 Input/output device A
32-1 Input/output device A
32-2 Input/output device A
51 Map space B
52 Map space N
53 Map space A
101 Application
107 CPU
108 Memory
109 Bridge
110 Input/output device
145 Address management table
151 Index unit
152 Page table
401 Virtual machine
402 Virtual machine monitor
4011 OS
4012 Input/output device driver

What is claimed is:

1. An input/output execution device comprising:
a memory configured to store instructions; and
one or more processors configured to execute the instructions to:
issue an input/output command to an input/output device connected via a network interface card (NIC) by accessing an area in a virtual space that is allocated to the input/output device;
set the area to a condition that a page fault occurs when the area is accessed;
detect the page fault occurring when the area is accessed, detect issuance of the input/output command, and identify the input/output command; and
generate an input/output packet same as an input/output packet that would be generated based on the identified input/output command being received from a device connected to a bridge of the input/output execution device; and
transmit the input/output packet to the input/output device.

2. The input/output execution device according to claim 1, wherein the one or more processors further execute the instructions to:
issue the input/output command by executing an instruction of writing in a specific address in the area or reading from the specific address, and
identify the input/output command, based on a type of the instruction that causes occurrence of the page fault and the specific address.

3. The input/output execution device according to claim 2, wherein the one or more processors is further configured to execute the instructions to:
transmit, when a received input/output packet that stores data and a specified address and requests the data to be written in the memory is received from the input/output device, a direct memory access (DMA) request; and
store, based on the DMA request, the data in the memory at the specified address.

4. A device virtualization system comprising:
the input/output execution device according to claim 2 in which the bridge and the input/output device are connected to each other by a bus conforming to a predetermined input/output bus standard,
wherein the one or more processors further execute the instructions to:
generate the input/output packet in response to the input/output command, conforming to the predetermined input/output bus standard;
load the input/output packet into a frame on a communication network, and transmit the frame; and
an input/output box including the input/output device and a remote bridge that connects the input/output device to the communication network, wherein
the remote bridge extracts the input/output packet from the frame on the communication network, and transmits the input/output packet to the input/output device.

5. The input/output execution device according to claim 1, wherein the one or more processors is further configured to execute the instructions to:

transmit, when a received input/output packet that stores data and a specified address and requests the data to be written in the memory is received from the input/output device, a direct memory access (DMA) request; and store, based on the DMA request, the data in the memory at the specified address.

6. A device virtualization system comprising:

the input/output execution device according to claim 5 in which the bridge and the input/output device are connected to each other by a bus conforming to a predetermined input/output bus standard, wherein the one or more processors further execute the instructions to:

generate the input/output packet in response to the input/output command, conforming to the predetermined input/output bus standard;

load the input/output packet into a frame on a communication network, and transmit the frame; and an input/output box including the input/output device and a remote bridge that connects the input/output device to the communication network, wherein the remote bridge extracts the input/output packet from the frame on the communication network, and transmits the input/output packet to the input/output device.

7. A device virtualization system comprising:

the input/output execution device according to claim 1 in which the bridge and the input/output device are connected to each other by a bus conforming to a predetermined input/output bus standard, wherein the one or more processors further execute the instructions to:

generate the input/output packet in response to the input/output command, conforming to the predetermined input/output bus standard;

load the input/output packet into a frame on a communication network, and transmit the frame; and an input/output box including the input/output device and a remote bridge that connects the input/output device to the communication network, wherein the remote bridge extracts the input/output packet from the frame on the communication network, and transmits the input/output packet to the input/output device.

8. The device virtualization system according to claim 7, wherein the one or more processors further execute the instructions to:

generate the input/output packet in such a way conforming to a PCI Express standard.

9. The device virtualization system according to claim 7, wherein the input/output execution device includes an operating system storing an address of the area being allocated to the connected input/output device, and the one or more processors further execute the instructions to:

retrieve, from the virtual space of the input/output execution device, an area that is not allocated to the input/output device connected to the input/output execution device; and allocate the retrieved area to the input/output device connected to the remote bridge.

10. An input/output execution method comprising:

setting, to a condition that a page fault occurs when an area in a virtual space that is allocated to an input/output device connected via a network interface card (NIC) is accessed;

issuing an input/output command to the input/output device by accessing the area;

detecting the page fault occurring when the area is accessed, detecting issuance of the input/output command, and identifying the input/output command; and generating an input/output packet same as an input/output packet that would be generated based on the identified input/output command being received from a device connected to a bridge of an input/output execution device; and transmitting the input/output packet to the input/output device.

11. The input/output execution method according to claim 10, further comprising:

issuing the input/output command by executing an instruction of writing in a specific address in the area or reading from the specific address; and identifying the input/output command, based on a type of the instruction that causes occurrence of the page fault, and the specific address.

* * * * *